US008613667B2

(12) United States Patent
Brunell et al.

(10) Patent No.: US 8,613,667 B2
(45) Date of Patent: Dec. 24, 2013

(54) POSITION-BASED LIGHTING COORDINATION IN WAGERING GAME SYSTEMS

(75) Inventors: Edward G. Brunell, Chicago, IL (US); Paul J. Radek, Naperville, IL (US)

(73) Assignee: WMS Gaming, Inc., Waukegan, IL (US)

( * ) Notice: Subject to any disclaimer, the term of this patent is extended or adjusted under 35 U.S.C. 154(b) by 158 days.

(21) Appl. No.: 12/971,544

(22) Filed: Dec. 17, 2010

(65) Prior Publication Data

US 2013/0184078 A1 Jul. 18, 2013

Related U.S. Application Data

(60) Provisional application No. 61/288,639, filed on Dec. 21, 2009.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................. 463/40; 463/16; 463/17; 463/30; 463/31; 463/41; 463/42; 463/46; 345/156

(58) Field of Classification Search

USPC ................ 463/16, 17, 30, 31, 40, 41, 42, 46; 345/156

See application file for complete search history.

(56) References Cited

U.S. PATENT DOCUMENTS

| | | | |
|---|---|---|---|
| 5,483,631 | A | 1/1996 | Nagai et al. |
| 5,633,933 | A | 5/1997 | Aziz |
| 6,040,831 | A | 3/2000 | Nishida |
| 6,081,266 | A | 6/2000 | Sciammaella |
| 6,146,273 | A | 11/2000 | Olsen |
| 6,647,119 | B1 | 11/2003 | Slezak |

(Continued)

FOREIGN PATENT DOCUMENTS

| | | |
|---|---|---|
| WO | WO2004075128 | 9/2004 |
| WO | WO2004075129 | 9/2004 |

(Continued)

OTHER PUBLICATIONS

PCT Application No. PCT/US10/43886 International Preliminary Report on Patentability, May 3, 2012 , 4 pages.

(Continued)

*Primary Examiner* — Adetokunbo O Torimiro

(74) *Attorney, Agent, or Firm* — DeLizio Gilliam, PLLC

(57) ABSTRACT

A wagering game system and its operations are described herein. In some embodiments, the operations can include detecting an indication to initiate a lighting presentation on a wagering game machine of a bank of wagering game machines. The operations can also include determining a position offset associated with the wagering game machine based, at least in part, on a position of the wagering game machine within the bank of wagering game machines relative to a reference wagering game machine of the bank of wagering game machines. The operations can further include determining a position-based time delay for initiating the lighting presentation on the wagering game machine based, at least in part, on the position offset associated with the wagering game machine, and initiating the lighting presentation on the wagering game machine after the position-based time delay associated with the wagering game machine.

25 Claims, 7 Drawing Sheets

(56) References Cited

U.S. PATENT DOCUMENTS

| | | | |
|---|---|---|---|
| 6,843,723 | B2 | 1/2005 | Joshi |
| 6,939,226 | B1 | 9/2005 | Joshi |
| 6,960,136 | B2 | 11/2005 | Joshi et al. |
| 6,972,528 | B2 | 12/2005 | Shao et al. |
| 6,974,385 | B2 | 12/2005 | Joshi et al. |
| 6,991,543 | B2 | 1/2006 | Joshi |
| 7,082,572 | B2 | 7/2006 | Pea et al. |
| 7,112,139 | B2 | 9/2006 | Paz Barahona et al. |
| 7,228,190 | B2 | 6/2007 | Dowling et al. |
| 7,364,508 | B2 | 4/2008 | Loose et al. |
| 7,367,886 | B2 | 5/2008 | Loose et al. |
| 7,449,839 | B1 | 11/2008 | Chen et al. |
| 7,479,063 | B2 | 1/2009 | Pryzby et al. |
| 7,666,091 | B2 | 2/2010 | Joshi et al. |
| 7,682,249 | B2 | 3/2010 | Winans et al. |
| 7,811,170 | B2 | 10/2010 | Winans et al. |
| 2002/0010018 | A1 | 1/2002 | Lemay et al. |
| 2002/0055978 | A1 | 5/2002 | Joon-Boo et al. |
| 2002/0160826 | A1 * | 10/2002 | Gomez et al. .................. 463/16 |
| 2003/0007648 | A1 | 1/2003 | Currell |
| 2003/0017865 | A1 | 1/2003 | Beaulieu et al. |
| 2003/0130033 | A1 * | 7/2003 | Loose ............................ 463/30 |
| 2003/0132722 | A1 | 7/2003 | Chansky et al. |
| 2004/0072610 | A1 | 4/2004 | White et al. |
| 2004/0160199 | A1 | 8/2004 | Morgan et al. |
| 2005/0043090 | A1 | 2/2005 | Pryzby et al. |
| 2005/0054440 | A1 | 3/2005 | Anderson et al. |
| 2005/0077843 | A1 | 4/2005 | Benditt |
| 2005/0116667 | A1 | 6/2005 | Mueller et al. |
| 2005/0128751 | A1 | 6/2005 | Roberge et al. |
| 2005/0164785 | A1 | 7/2005 | Connelly |
| 2005/0164786 | A1 | 7/2005 | Connelly |
| 2005/0164787 | A1 | 7/2005 | Connelly |
| 2005/0164788 | A1 | 7/2005 | Grabiec |
| 2005/0174473 | A1 | 8/2005 | Morgan et al. |
| 2005/0239545 | A1 | 10/2005 | Rowe |
| 2005/0248299 | A1 | 11/2005 | Chemel et al. |
| 2005/0275626 | A1 * | 12/2005 | Mueller et al. ................ 345/156 |
| 2005/0277469 | A1 | 12/2005 | Pryzby et al. |
| 2005/0282631 | A1 | 12/2005 | Bonney et al. |
| 2006/0009285 | A1 | 1/2006 | Pryzby et al. |
| 2006/0022214 | A1 | 2/2006 | Morgan et al. |
| 2006/0046829 | A1 | 3/2006 | White |
| 2006/0076908 | A1 | 4/2006 | Morgan et al. |
| 2006/0253781 | A1 | 11/2006 | Pea et al. |
| 2007/0008711 | A1 | 1/2007 | Kim |
| 2007/0189026 | A1 | 8/2007 | Chemel et al. |
| 2007/0218970 | A1 | 9/2007 | Patel et al. |
| 2007/0218974 | A1 | 9/2007 | Patel et al. |
| 2007/0291483 | A1 | 12/2007 | Lys |
| 2007/0293304 | A1 | 12/2007 | Loose et al. |
| 2008/0039213 | A1 | 2/2008 | Cornell et al. |
| 2008/0070685 | A1 | 3/2008 | Pryzby et al. |
| 2008/0094005 | A1 | 4/2008 | Rabiner et al. |
| 2008/0113715 | A1 * | 5/2008 | Beadell et al. .................. 463/17 |
| 2008/0113796 | A1 | 5/2008 | Beadell et al. |
| 2008/0161108 | A1 | 7/2008 | Dahl et al. |
| 2008/0176647 | A1 | 7/2008 | Acres |
| 2008/0231203 | A1 | 9/2008 | Budde et al. |
| 2008/0278946 | A1 | 11/2008 | Tarter et al. |
| 2008/0288607 | A1 | 11/2008 | Muchow |
| 2008/0309259 | A1 | 12/2008 | Snijder et al. |
| 2009/0009997 | A1 | 1/2009 | Sanfilippo et al. |
| 2009/0170597 | A1 | 7/2009 | Bone et al. |
| 2009/0197673 | A1 | 8/2009 | Bone et al. |
| 2009/0206773 | A1 | 8/2009 | Chang |
| 2009/0270167 | A1 | 10/2009 | Arata et al. |
| 2009/0298579 | A1 | 12/2009 | Radek et al. |
| 2009/0318223 | A1 | 12/2009 | Langridge et al. |
| 2010/0022298 | A1 | 1/2010 | Kukita |
| 2010/0029385 | A1 | 2/2010 | Garvey et al. |
| 2010/0031186 | A1 | 2/2010 | Tseng et al. |
| 2010/0075750 | A1 | 3/2010 | Bleich et al. |
| 2010/0113136 | A1 | 5/2010 | Shridhar et al. |
| 2010/0171145 | A1 | 7/2010 | Morgan et al. |
| 2010/0213876 | A1 | 8/2010 | Adamson et al. |
| 2010/0277079 | A1 | 11/2010 | Van Der Veen et al. |
| 2010/0309016 | A1 | 12/2010 | Wendt et al. |
| 2010/0317437 | A1 | 12/2010 | Berry et al. |
| 2011/0035404 | A1 | 2/2011 | Morgan et al. |
| 2011/0045905 | A1 | 2/2011 | Radek |
| 2011/0050101 | A1 | 3/2011 | Bailey et al. |
| 2012/0129601 | A1 | 5/2012 | Gronkowski et al. |
| 2012/0178528 | A1 | 7/2012 | Brunell et al. |

FOREIGN PATENT DOCUMENTS

| | | |
|---|---|---|
| WO | WO2004086320 | 10/2004 |
| WO | WO2005111459 | 12/2005 |
| WO | WO2005111764 | 12/2005 |
| WO | WO2005113089 | 12/2005 |
| WO | WO2005114598 | 12/2005 |
| WO | WO2006017444 | 2/2006 |
| WO | WO2006017445 | 2/2006 |
| WO | WO2006033941 | 3/2006 |
| WO | WO2006039284 | 4/2006 |
| WO | WO2006039323 | 4/2006 |
| WO | WO2006125013 | 11/2006 |
| WO | WO2007022294 | 2/2007 |
| WO | WO2007022343 | 2/2007 |
| WO | WO2007133566 | 11/2007 |
| WO | WO2008057538 | 5/2008 |
| WO | WO2008063391 | 5/2008 |
| WO | WO2008137130 | 11/2008 |
| WO | WO2009054930 | 4/2009 |
| WO | WO2010048068 | 4/2010 |
| WO | WO2011005798 | 1/2011 |
| WO | WO2011014760 | 2/2011 |

OTHER PUBLICATIONS

U.S. Appl. No. 13/094,560 Office Action, Mar. 30, 2012 , 13 pages.
U.S. Appl. No. 13/094,701 Office Action, Mar. 27, 2012 , 26 pages.
U.S. Appl. No. 13/094,811 Office Action, Apr. 3, 2012 , 16 pages.
PCT Application No. PCT/US10/43886 International Search Report, Sep. 16, 2010 , 12 pages.
U.S. Appl. No. 12/797,756, Dec. 16, 2010, filed Jun. 10, 2010, Berry, Robert G., et al.
U.S. Appl. No. 12/860,467, filed Aug. 20, 2010, Radek, Paul J.
U.S. Appl. No. 12/965,749, filed Dec. 10, 2010, Brunell, Edward G., et al.
U.S. Appl. No. 13/094,701, filed Apr. 26, 2011, Brunell, Edward G., et al.
U.S. Appl. No. 13/094,811, filed Apr. 26, 2011, Brunell, Edward G., et al.
U.S. Appl. No. 13/094,560, filed Apr. 26, 2011, Brunell, Edward G., et al.
PCT Application No. PCT/US10/41112 International Search Report, Sep. 2, 2010 , 11 pages.
PCT Application No. PCT/US10/41112 International Preliminary Report on Patentability, Aug. 31, 2012 , 4 pages.
U.S. Appl. No. 12/965,749 Office Action, Nov. 8, 2012 , 30 pages.
U.S. Appl. No. 13/094,701 Final Office Action, Nov. 28, 2012 , 14 pages.
U.S. Appl. No. 12/860,467 Office Action, Jan. 17, 2013 , 16 pages.
U.S. Appl. No. 12/965,749 Final Office Action, Apr. 22, 2013 , 30 pages.
U.S. Appl. No. 13/382,738 Office Action, Feb. 7, 2013 , 41 pages.
"U.S. Appl. No. 13/382,738 Office Action", Sep. 24, 2013, 24 Pages.
"U.S. Appl. No. 13/094,811 Office Action", Jun. 21, 2013, 19 pages.
"U.S. Appl. No. 13/382,783 Office Action", Jul. 25, 2013, 20 Pages.
"U.S. Appl. No. 13/388,118 Office Action", Oct. 11, 2013, 9 Pages.

* cited by examiner

POSITION-BASED LIGHTING COORDINATION IN WAGERING GAME SYSTEMS

RELATED APPLICATIONS

This application claims the priority benefit of U.S. Provisional Application Ser. No. 61/288,639 filed Dec 21, 2009.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

FIELD

Embodiments of the inventive subject matter relate generally to wagering game systems, and more particularly to position-based lighting coordination in wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments are illustrated in the Figures of the accompanying drawings in which.

DESCRIPTION OF THE EMBODIMENTS

This description of the embodiments is divided into five sections. The first section provides an introduction to some embodiments, while the second section describes example wagering game machine architectures. The third section describes example operations performed by some embodiments and the fourth section describes example wagering game machines in more detail. The fifth section presents some general comments.

Introduction

This section provides an introduction to some embodiments.

Wagering game systems offer wagering game players ("players") entertainment value and the opportunity to win monetary value. In various embodiments, wagering game systems can try to enhance the gaming experience by networking a plurality of wagering game machines together to form groups or banks of wagering game machines. Besides offering the same type of wagering game to a group of players, banks of wagering game machines can offer players the option to play multiplayer games, cooperative games, and other group-related wagering games. Each bank of wagering game machines can also provide coordinated lighting and audio presentations across the bank of wagering game machines (e.g., celebrating a win or other game event) to further enhance the player's gaming experience. In some examples, each wagering game machine in a bank of wagering game machines can coordinate when the wagering game machine initiates the lighting presentation, such that the wagering game machines in the bank collectively present one or more light effects across the bank of wagering game machines. For example, the bank of wagering game machines can collectively present light effects such as light washes or chases from the leftmost wagering game machine in the bank to the rightmost wagering game machine in the bank (or vice versa, from right to left). In another example, the bank of wagering game machines can collectively present a radiating outward and inward light effect from a reference wagering game machine in the bank. In some embodiments, to coordinate the lighting presentations across the bank of wagering game machines, each wagering game machine determines its position within the bank relative to a reference wagering game machine to determine a position offset. Each wagering game machine then determines a position-based time delay based on the position offset to determine how much time to delay initiating the lighting presentation to achieve the desired light effect across the bank, as will be further described below with reference to FIGS. 1-7.

Figure 1:
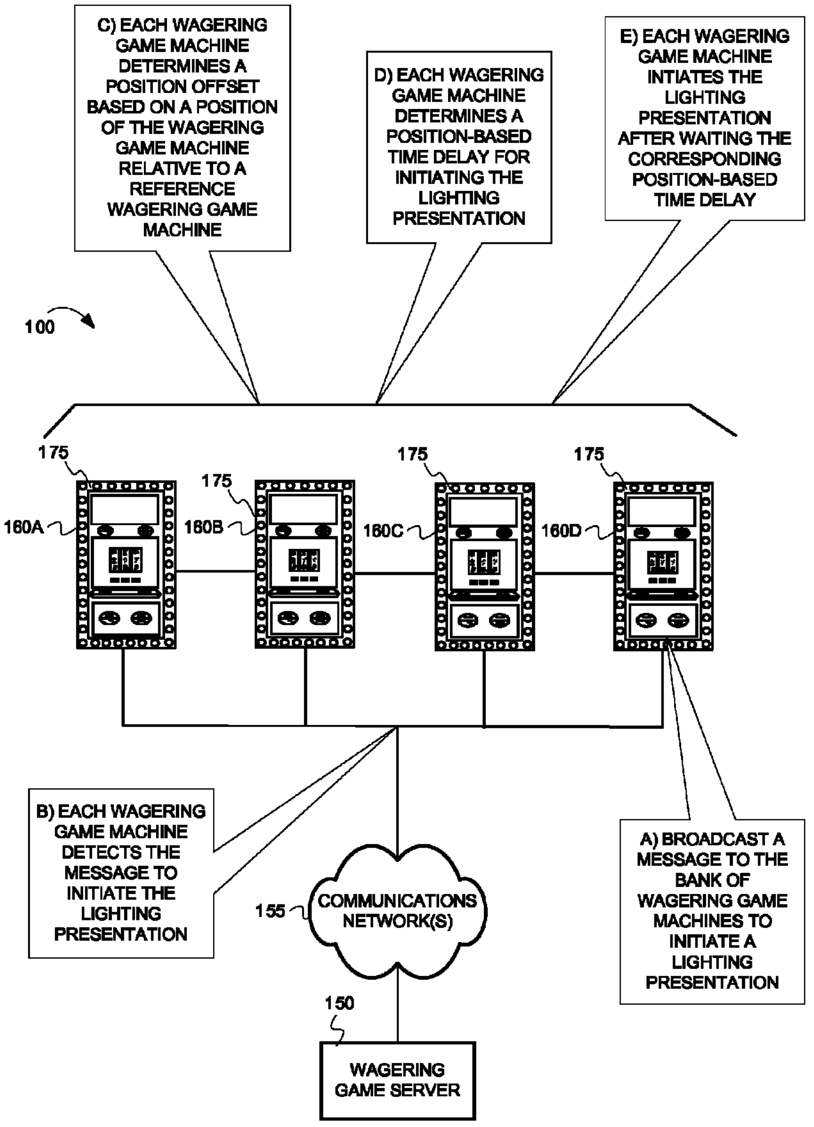
FIG. 1 is a conceptual diagram illustrating an example of implementing a position-based lighting coordination mechanism in a bank of wagering game machines of a wagering game system, according to some embodiments.

FIG. 1 is a conceptual diagram illustrating an example of implementing a position-based lighting coordination mechanism in a bank of wagering game machines of a wagering game system, according to some embodiments. In the example shown in FIG. 1, the wagering game system 100 includes a wagering game server 150 connected to a plurality of wagering game machines 160 via a communications network 155. The wagering game system 100 can include one or more sub-networks or banks of associated wagering game machines; e.g., it can include the bank of wagering game machines 160A-160D shown in FIG. 1. The wagering game machines 160A-160D can include emotive lighting devices 175 utilized to present light effects at each machine during a lighting presentation. Examples of emotive lighting devices can include light emitting display (LED) bars attached to a wagering game machine cabinet, lights on a cabinet top-box, marquee lights, gaming chair lighting, reel illuminator lights, etc. The wagering game machines 160A-160D can include emotive light controllers configured to control the emotive light devices 175 at each machine during a lighting presentation. The emotive light controllers are also configured to implement a position-based lighting coordination process for coordinating lighting presentations across the bank of wagering game machines, as will be further described below. The coordinated lighting presentations can be incorporated as part of an attract mode to bring attention to the bank of wagering game machines, a celebration presentation following a win (or other game event) at the bank of wagering game machines, or other casino-related environmental presentations.

In one example, at stage A, a wagering game machine in the bank of wagering game machines 160A-160D transmits a message to each wagering game machine in the bank to initiate a lighting presentation. For example, the wagering game machine broadcasts a multicast message to the bank of wagering game machines 160A-160D. The message may include an indication to initiate the lighting presentation. The message may also include information associated with the lighting presentation; e.g., a lighting presentation ID number identifying which lighting presentation to initiate. The message may further include information used to implement the position-based lighting coordination process; e.g., the message may include an indication of the reference wagering game machine and the base time delay associated with the lighting presentation. The indication of the reference wagering game machine can include identification information indicating which wagering game machine of the bank of wagering game machines 160A-160D will be the reference wagering game machine. In one example, the reference wagering game machine is the node in the bank where the light effects across the bank originate. For instance, in the example shown in FIG. 1, if the light effects across the bank of wagering game machines 160A-160D originate from the leftmost wagering game machine in the bank, the wagering game machine 160A will be the reference wagering game machine. If the light effects across the bank originate from the rightmost wagering game machine in the bank, the wagering game machine 160D will be the reference wagering game machine. If the light effects across the bank originate from the wagering game machine that triggers the lighting presentations (e.g., in response to a game-related event, such as a celebration of a win), the trigger wagering game machine will be the reference wagering game machine. Since the reference wagering game machine is the point of origin that initiates the light effects across the bank, the indication of the reference wagering game machine can be used to determine the position offset associated with each wagering game machine, as will be further described below. In one example, the base time delay is the amount of time the lighting presentation at each wagering game machine is delayed from the time an adjacent wagering game machine initiates the lighting presentation. For instance, in the example shown in FIG. 1, if the light effects associated with a lighting presentation originate from the leftmost wagering game machine and the base time delay is 250 msec, the delay of the light effects between wagering game machines 160A and 160B is 250 msec, the delay of the light effects between wagering game machines 160B and 160C is 250 msec, etc. In one embodiment, the base time delay can be used along with a position offset to calculate the position-based time delay for each wagering game machine in the bank, as will be further described below.

In one example, the message associated with the lighting presentation can be transmitted from a wagering game machine in the bank that detects a game-related event, e.g., a win in the wagering game or a trigger of a bonus game that requires a celebration. In another example, the message is received from a master wagering game machine in the bank that broadcasts messages to the bank originating from the wagering game machines or from the casino (e.g., the wagering game server 150). For example, the message can be received at the master wagering game machine from one of the wagering game machines in the bank to initiate a celebration, or it can be a message received at the master wagering game machine from the wagering game server 150 (or other casino network component) to initiate a lighting presentation for an attract mode in the bank. In another example, the wagering game server 150 can transmit the message directly to the bank of wagering game machines 160A-160D.

At stage B, each of the wagering game machines 160A-160D in the bank detects the message to initiate the lighting presentation. For example, each of the wagering game machines 160A-160D in the bank receives the message including a trigger to initiate the lighting presentation, information about the lighting presentation, and information used to implement the position-based lighting coordination process, as was described above at stage A. For example, the message can include a lighting presentation ID number, an indication of the reference wagering game machine, and the base time delay.

At stage C, each of the wagering game machines 160A-160D in the bank determines a position offset based on the position of the wagering game machine relative to the reference wagering game machine of the bank. In one embodiment, each wagering game machine can determine the position offset based on a position number associated with the wagering game machine and a position number associated with the reference wagering game machine. In one embodiment, the wagering game machine operator can program each wagering game machine with a position number when the operator configures the bank of wagering game machines. For instance, in the example shown in FIG. 1, the operator can program the wagering game machines 160A-160D with a position number from left to right. In this example, the wagering game machine 160A would be programmed a "1" for position number, the wagering game machine 160B would be programmed with a "2" for position number, the wagering game machine 160C would be programmed with a "3" for position number, and the wagering game machine 160D would be programmed with a "4" for position number. In other embodiments, the operator can program the bank of wagering game machines with a position number from right to left. Furthermore, the operator can also program each wagering game machine with an indication of the number of wagering game machines in the bank, and a bank (or group) number to distinguish between different banks of wagering game machines in the wagering game system 100.

Figure 2:
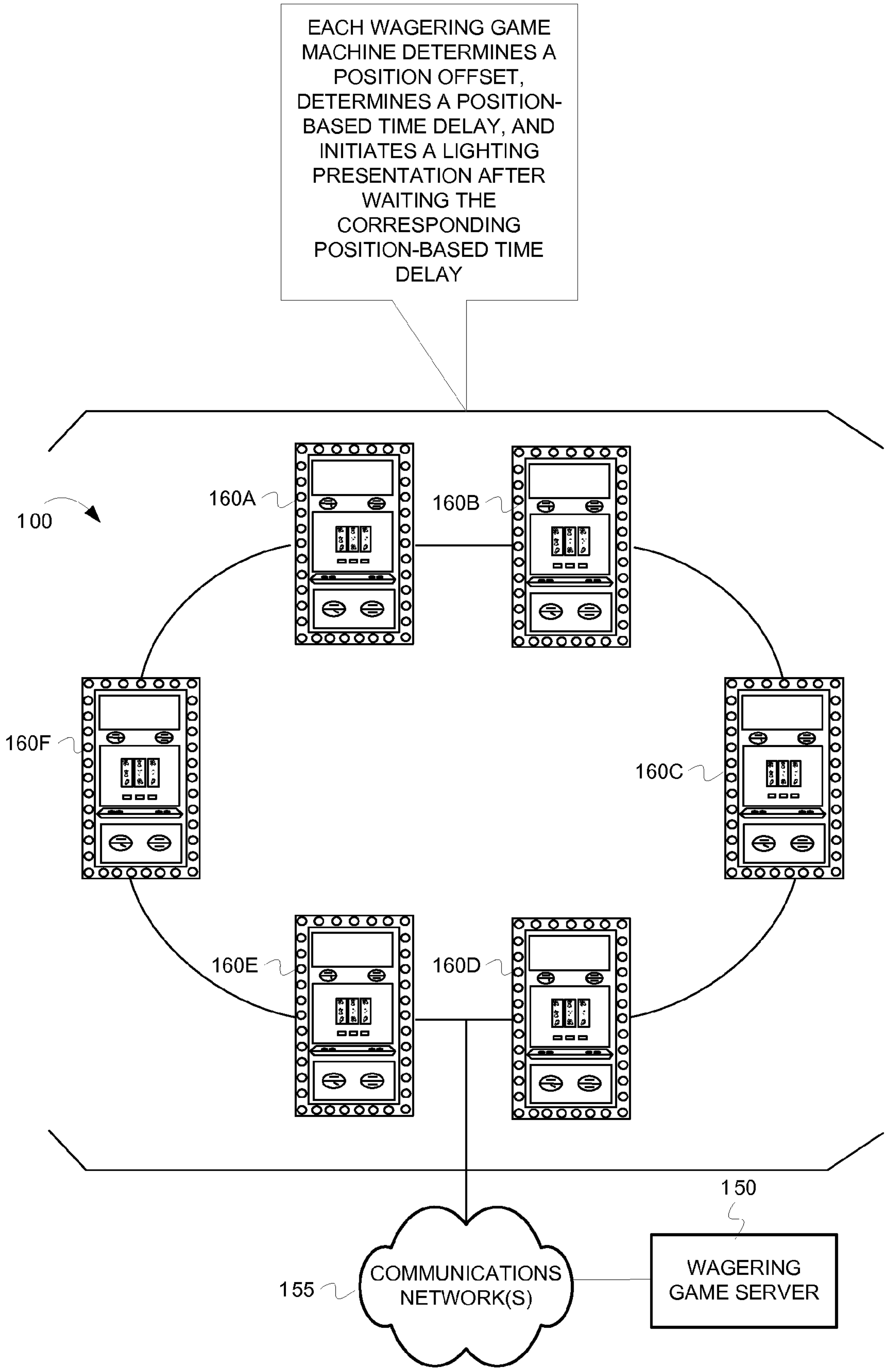
FIG. 2 is a conceptual diagram illustrating another example of implementing a position-based lighting coordination mechanism in a bank of wagering game machines of a wagering game system, according to some embodiments.

In one embodiment, for light effects from leftmost node to rightmost node (or from rightmost node to leftmost node) in a bank of wagering game machines, each wagering game machine can determine the position offset by subtracting the position number associated with the reference wagering game machine from the position number associated with the wagering game machine (or vice versa). For example, if the reference wagering game machine is the wagering game machine 160D programmed with a "4" for position number (i.e., the rightmost node), the wagering game machine 160B programmed with a "2" for position number can calculate a position offset of 2 relative to the reference wagering game machine. In one embodiments, a wagering game machine in the bank of wagering game machines can trigger the lighting presentations across the bank in response to a game-related event (e.g., celebration for a win), or can be selected to be the trigger wagering game machine for a casino-related event (e.g., an attract mode). In this embodiment, if the bank of wagering game machines will collectively present a radiating outward (or inward) light effect from the trigger wagering game machine, each of the wagering game machines in the bank can be assigned a radiating position number relative to the trigger wagering game machine. In one example, the trigger wagering game machine (which will also be the reference wagering game machine) can be assigned a radiating position number of "1". Both the wagering game machine immediately to the right and the wagering game machine immediately to the left of the trigger wagering game machine can be assigned a radiating position number of "2". The wagering game machines in the next position to the right and to the left can be assigned a radiating position number of "3", and so on. In one example, the position numbers assigned by the wagering game machine operator, and the knowledge of how many wagering game machines are in the bank, can be used to determine the radiating position numbers for each of the wagering game machines in the bank. For radiating outward (or inward) light effects, each wagering game machine in the bank can determine the position offset by subtracting the radiating position number associated with the reference (or trigger) wagering game machine from the radiating position number associated with the wagering game machine. In FIG. 2, one example of implementing this technique for determining the position offset will be described for a bank of wagering game machines arranged in a circular arrangement. It is noted, however, that in other embodiments the position numbers for a bank of wagering game machines can be assigned by other techniques; e.g., the master wagering game machine or the trigger wagering game machine of the bank can assign the position numbers associated with a particular type of light effect (e.g., radiating outward light effect) when it sends the message indicating information about the lighting presentation.

At stage D, each of the wagering game machines 160A-160D in the bank determines a position-based time delay for initiating the lighting presentation. In one embodiment, each wagering game machine determines the position-based time delay based on the position offset associated with the wagering game machine and the base time delay associated with the lighting presentation. The position-based time delay associated with a wagering game machine is the amount of time the wagering game machine will wait to initiate the lighting presentation. Each wagering game machine can determine the position-based time delay by multiplying the position offset with the base time delay. Since each wagering game machine in the bank has a different position offset, each wagering game machine will have a different position-based time delay that varies by some multiple of the base time delay. Since the position-based time delay for each wagering game machine of the bank will vary by some multiple of the base time delay, the initiation of the lighting presentation at each wagering game machine can be coordinated such that light effects (e.g., light washes, chases, etc.) can be presented across the bank of wagering game machines 160A-160D.

In some embodiments, the position-based time delay and the base time delay can be in terms of a synchronization or "heartbeat" signal that is provided to the bank of wagering game machines 160A-160D to help with synchronization of lighting presentations. For example, the synchronization signal can be a signal that is pulsed at periodic interval of time. In one specific example, the synchronization message can be pulsed 40 times per second, or once every 25 milliseconds. In another example, the synchronization signal can be a message that is transmitted at a periodic interval of time. The position-based time delay and the base time delay can be a specific number of cycles of the synchronization signal. For example, if the base time delay is 5 cycles of the synchronization signal and the position offset is 2, the position-based time delay is 10 cycles of the synchronization signal. In this example, the wagering game machine would wait 10 cycles of the synchronization signal before initiating the lighting presentation. In one embodiment, each wagering game machine waits the position-based time delay from a predefined point in time associated with the synchronization signal (e.g., from the next cycle of the synchronization signal after receiving the message or from another specified future cycle of the synchronization signal). In one embodiment, the master wagering game machine of the bank transmits the synchronization message to all the wagering game machines in the bank. It is noted, however, that in other embodiments, instead of utilizing a synchronization signal, the wagering game machines in the bank can implement the position-based time delay and the base time delay in terms of a common timer or another type of time references associated with the bank. In other embodiments, each wagering game machine waits the position-based time delay from a predefined point in time specified within the received multicast message, or waits the position-based time day from the time the wagering game machine receives the multicast message.

At stage E, each wagering game machine initiates the lighting presentation after waiting the corresponding position-based time delay. For instance, in one example, the lighting presentation comprises turning on all of the emotive lighting devices 175 of a wagering game machine of the bank for 2 seconds, then turning off all the emotive lighting devices 175 for 1 second, then turning on all the emotive lighting devices 175 for 2 seconds, etc. In this example, assuming wagering game machine 160D is the reference wagering game machine and the base time delay is 5 cycles of the synchronization signal, the wagering game machine 160D would first turn on all the emotive lighting devices 175 for 2 seconds (e.g., immediately or at the start of the next cycle of the synchronization signal). The wagering game machine 160C would wait 5 cycles of the synchronization signal (i.e., the position-based time delay) to turn on all the emotive lighting devices 175 of the wagering game machine 160C for 2 seconds. The wagering game machine 160B would wait 10 cycles of the synchronization signal (i.e., the position-based time delay) to turn on all the emotive lighting devices 175 of the wagering game machine 160B for 2 seconds. The wagering game machine 160A would wait 15 cycles of the synchronization signal (i.e., the position-based time delay) to turn on all the emotive lighting devices 175 of the wagering game machine 160A for 2 seconds. This results in a light effect across the bank of wagering game machines 160A-160D (e.g., a light chase across the bank). Since each wagering game machine in the bank initiates the lighting presentation according to the position-based time delay, both the turning on and the turning off of the emotive lighting devices 175 will be presented in a coordinated manner during the rest of the lighting presentation.

It is noted that, although in some embodiments the same message associated with a lighting presentation can be sent to all the wagering game machines 160A-160D in the bank, in other embodiments different message can be sent that are customized for each of the wagering game machines 160A-160D. For example, in addition to including a trigger to initiate the lighting presentation and an indication of the reference wagering game machine, the message can include information about a lighting presentation that is customized for each wagering game machine in the bank. In other words, the wagering game machines in the bank can each present a customized lighting presentation (that may be different than the other lighting presentations), while still utilizing the position-based time delay for coordinating the start of the lighting presentation. If one or more of the wagering game machines in the bank present different lighting presentations, various types of light effects can be achieved across the bank of wagering game machines. For example, while still utilizing the position-based time delay technique, the wagering game machine 160A and the wagering game machine 160C can present a lighting presentation where the emotive lighting devices 175 remain solid when they are turned on, and the wagering game machine 160B and the wagering game machine 160D can present a different lighting presentation where the emotive lighting devices 175 blink when they are turned on.

It is further noted that lighting presentations across banks of wagering game machines arranged in other configurations can also be coordinated in a similar manner to present light effects across the banks of wagering game machines, as will be further described below with reference to FIG. 2.

FIG. 2 is a conceptual diagram illustrating another example of implementing a position-based lighting coordination mechanism in a bank of wagering game machines of a wagering game system, according to some embodiments. In the example shown in FIG. 2, the wagering game sever 150 of the wagering game system 100 is connected to a bank of wagering game machines 160A-160F via the communications network 155.

In one embodiment, after receiving a message including information about a lighting presentation, each wagering game machine 160A-160F in the bank determines a position offset based on a position of the wagering game machine relative to a reference wagering game machine of the bank. As described above, in one embodiment, if the bank of wagering game machines 160A-160F will collectively present a radiating outward (or inward) light effect from a trigger wagering game machine, each of the wagering game machines 160A-160F can be assigned a radiating position number relative to the trigger wagering game machine. In one example, if the trigger wagering game machine (which will also be the reference wagering game machine) is the wagering game machine 160C, the wagering game machine 160C is assigned a radiating position number of “1”. Both the wagering game machine 160 immediately to the right and the wagering game machine 160D immediately to the left of the trigger wagering game machine are assigned a radiating position number of “2”. The wagering game machine 160A and the wagering game machine 160E are assigned a radiation position number of “3”, and the wagering game machine 160F is assigned a radiation position number of “4”. In this example, for radiating outward (or inward) light effects, each wagering game machine 160A-160F can determine the position offset by subtracting the radiating position number associated with the reference (or trigger) wagering game machine from the radiating position number associated with the wagering game machine. For example, if the reference wagering game machine is wagering game machine 160C, the position offset associated with the wagering game machine 160D is 1, the position offset associated with the wagering game machine 160A is 2, and the position offset associated with wagering game machine 160F is 3.

After determining the position offset, each wagering game machine 160A-160F determines a position-based time delay for initiating the lighting presentation, as was described above with reference to FIG. 1. Then, each wagering game machine 160A-160F initiates the lighting presentation after waiting the corresponding position-based time delay.

In some embodiments, the bank of wagering game machines 160A-160F shown in FIG. 2 can collectively present a radiating outward light effect from a trigger wagering game machine that wraps around and then radiates inward. Also, the bank of wagering game machines 160A-160D shown in FIG. 1 can collectively present a light effect that initially moves from the leftmost wagering game machine to the rightmost wagering game machine, and then “bounces back” moving from the rightmost wagering game machine to the leftmost wagering game machine. In some examples, two or more position offsets and two or more position-based time delays can be determined for each the wagering game machines for these types of light effects, as will be described further below with reference to FIG. 5.

It is noted that in some embodiments the banks of wagering game machines in the wagering game system 100 can include other presentation components, such as directional lighting (spotlights), LCD displays, overhead lighting, and other casino-lighting devices (not shown). In these embodiments, the position-based lighting coordination process can also be used to coordinate light effects involving these additional presentation components, or to skip certain presentation components, as will be described further below.

Furthermore, in some embodiments, the position-based lighting coordination process can be used to directly or indirectly coordinate other events associated with the lighting presentation. For example, the lighting presentation can also trigger a sound presentation that is associated with the lighting presentation. The content of the sound presentation can include sound effects tied to, or closely associated with light effects of the lighting presentation. In one example, the lighting devices that have associated sound production devices can have sound scripts, or audio playlists, which refer to sound content associated with the light effects. For instance, each of the wagering game machines in the bank can have audio playlists that match up to lighting control data used by emotive lighting controllers in the bank to present the lighting presentation. Sound controllers at the wagering game machines can receive the lighting control data from the emotive lighting controllers and play sounds that are associated with the light effect. It is noted that in some embodiments the sound controllers in each wagering game machine of the bank can similarly utilize the position-based information described above to coordinate sound presentations with the associated lighting presentations.

Although FIGS. 1 and 2 describe some embodiments, the following sections describe many other features and embodiments.

Operating Environment

This section describes example operating environments and networks and presents structural aspects of some embodiments. More specifically, this section includes discussion about wagering game system architectures.

Wagering Game System Architectures

Figure 3:
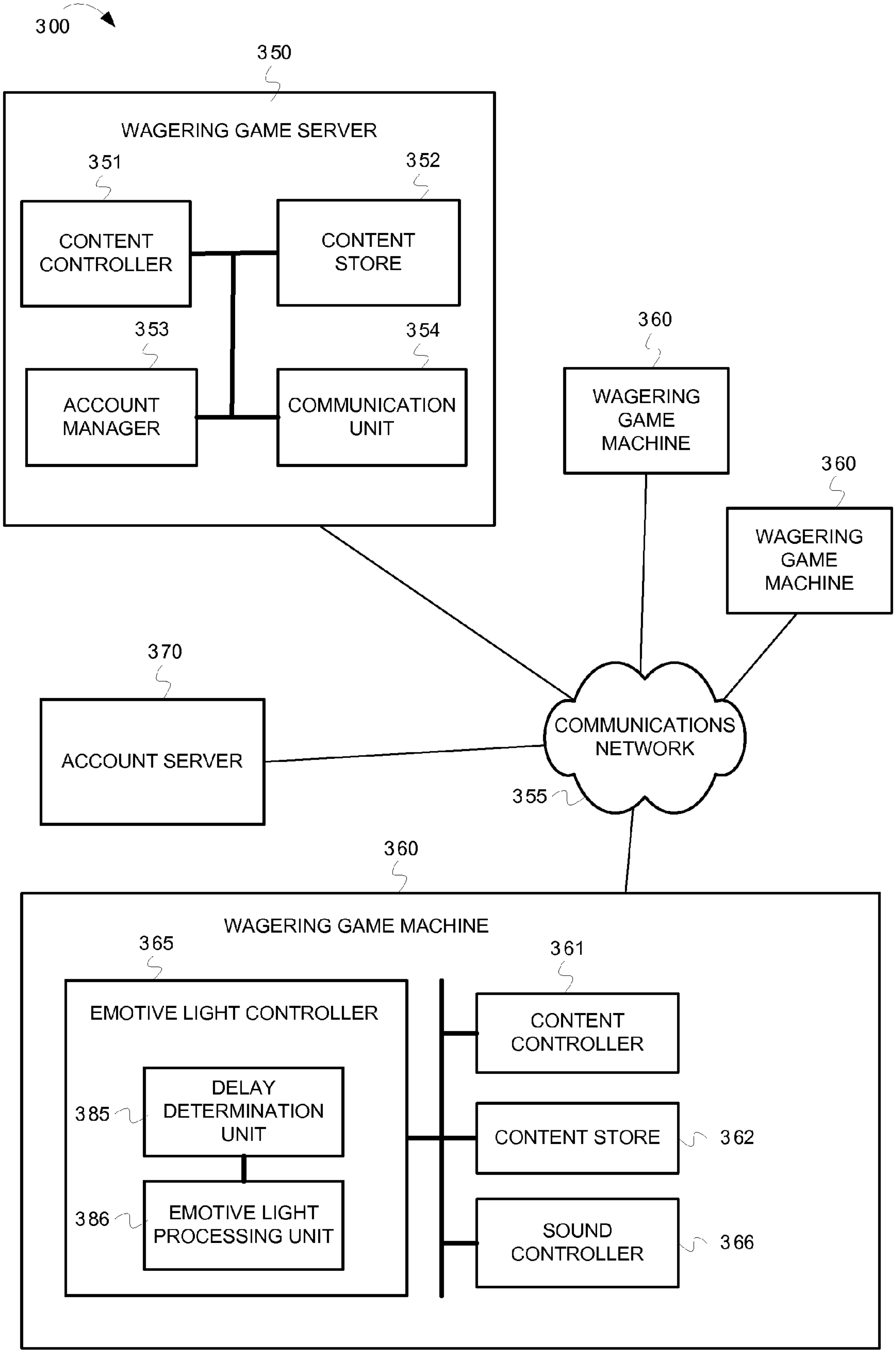
FIG. 3 is a conceptual diagram that illustrates an example of a wagering game system architecture, according to some embodiments.

FIG. 3 is a conceptual diagram that illustrates an example of a wagering game system architecture 300, according to some embodiments. The wagering game system architecture 300 can include an account server 370 configured to control player related accounts accessible via wagering game networks and social networks. The account server 370 can store and track player information, such as identifying information (e.g., avatars, screen name, account identification numbers, etc.) or other information like financial account information, social contact information, etc. The account server 370 can contain accounts for social contacts referenced by the player account. The account server 370 can also provide auditing capabilities, according to regulatory rules, and track the performance of players, machines, and servers.

The wagering game system architecture 300 can also include a wagering game server 350 configured to control wagering game content, provide wagering game results (e.g., random numbers), and communicate wagering game information, account information, and other information to and from a plurality of wagering game machines 360. The wagering game server 350 can include a content controller 351 configured to manage and control content for the presentation of content on the wagering game machines 360. For example, the content controller 351 can generate (e.g., using a random numbers generator) game results (e.g., win/loss values), including win amounts, for wagering games played on the wagering game machines 360. The content controller 351 can communicate the game results to the wagering game machines 360 via the network 355. In some implementations, the content controller 351 can also generate random numbers and provide them to the wagering game machines 360 so that the machines 360 can generate game results. The wagering game server 350 can also include a content store 352 configured to store content used for presenting wagering games (e.g., base wagering games, secondary bonus games, etc.) and other information on the wagering game machines 360. The wagering game server 350 can also include an account manager 353 configured to control information related to player accounts. For example, the account manager 353 can communicate wager amounts, game results amounts (e.g., win amounts), bonus game amounts, etc., to the account server 370. The wagering game server 350 can also include a communication unit 354 configured to communicate information to the wagering game machines 360 and to communicate with other systems, devices and networks.

The wagering game system architecture 300 can also include a plurality of wagering game machines 360 configured to present wagering games and receive and transmit information to control the content that is presented for the wagering games. The wagering game machines 360 can each include a content controller 361 configured to manage and control content and presentation of content on the wagering game machine 360. The content controller 361 can also generate game results based on random numbers received from the wagering game server 350, or may communicate with the wagering game server 350 to obtain the game results. The wagering game machines 360 can also include a content store 362 configured to store content that is presented on the wagering game machine 360. Furthermore, the wagering game machines 360 can each include an emotive light controller 365 configured to control lighting presentations at the wagering game machine 360. For example, the emotive light controller 365 can provide lighting control data to the emotive light devices of the wagering game machine 360 to control the lighting effects associated with the lighting presentations. Furthermore, the emotive light controller 365 may include a delay determination unit 385 and an emotive light processing unit 386 configured to implement a position-based lighting coordination process in a bank of wagering game machines, as described herein with reference to FIGS. 1-2 and 4-5. The delay determination unit 385 is configured to determine a position-based time delay associated with the wagering game machine 360 based, at least in part, on a position offset. The lighting processing unit 386 is configured to initiate a lighting presentation after waiting for the position-based time delay. In other embodiments, the emotive light controller 365 may be associated with the wagering game machine 360, though not necessarily integral with, or included in, the wagering game machine 360. For example, in one embodiment, the emotive light controller 365 may be connected to, and control, emotive lighting devices that are attached to a cabinet for the wagering game machine 360, or that are proximate to, the wagering game machine 360. Each wagering game machine 360 can also include a sound controller 366 configured to determine sound content associated with lighting control data and present the sound content contemporaneously with (e.g., in synchronicity with, in direct connection with, immediately following) a lighting presentation, as was described above.

Each component shown in the wagering game system architecture 300 is shown as a separate and distinct element connected via the communications network 355. However, some functions performed by one component could be performed by other components. For example, the emotive light controller 365 can also be configured to perform functions of the sound controller 366, and other network elements and/or system devices. Furthermore, the components shown may all be contained in one device, but some, or all, may be included in, or performed by multiple devices, as in the configurations shown in FIG. 3 or other configurations not shown. For example, the account manager 353 and the communication unit 354 can be included in the wagering game machine 360 instead of, or in addition to, being a part of the wagering game server 350.

The wagering game machines described herein (e.g., wagering game machines 360) can take any suitable form, such as floor standing models, handheld mobile units, bar-top models, workstation-type console models, surface computing machines, etc. Further, wagering game machines can be primarily dedicated for use in conducting wagering games, or in some examples can also include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the player. In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 300 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable storage media includes read only memory (ROM), random access memory (RAM), magnetic disk storage media, optical storage media, flash memory machines, and other types of tangible storage medium suitable for storing instructions. Machine-readable transmission media includes any media suitable for transmitting software over a network.

Example Operations

This section describes operations associated with some embodiments. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 4:
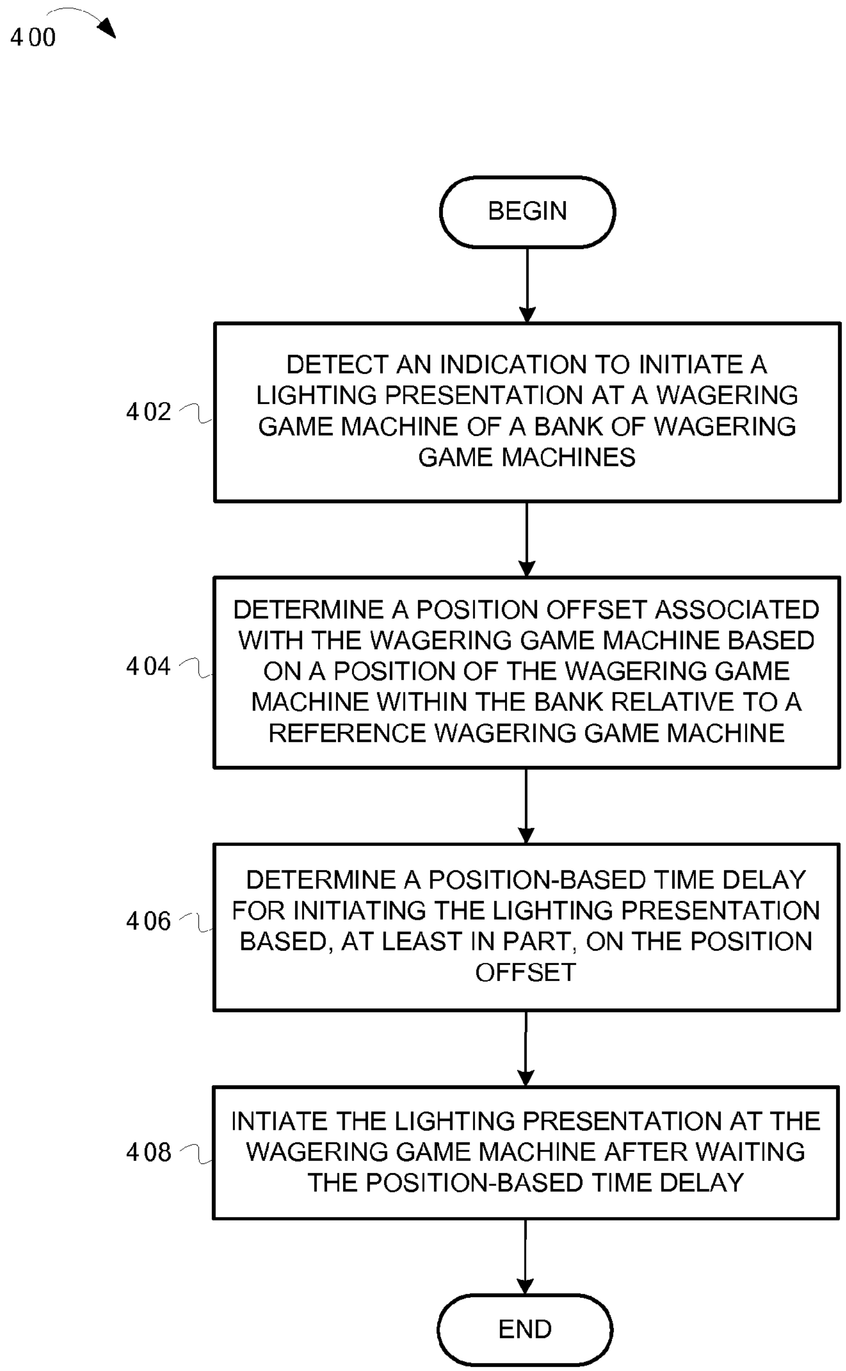
FIG. 4 is a flow diagram illustrating operations for implementing a position-based lighting coordination process in a bank of wagering game machines, according to some embodiments.

FIG. 4 is a flow diagram ("flow") 400 illustrating operations for implementing a position-based lighting coordination process in a bank of wagering game machines, according to some embodiments. The flow of 400 will be described with reference to the example system architecture of FIG. 3. Although the functionality of one of the wagering game machine is highlighted in this example, it is noted that each of the wagering game machines in the bank can implement similar functionality as described herein. The flow diagram begins at block 402.

At block 402, an emotive light controller 365 of a wagering game machine 360 in a bank of wagering game machines detects an indication to initiate a lighting presentation at the wagering game machine 360. In one embodiment, the emotive light processing unit 386 of the emotive light controller 365 receives a message including an indication to initiate the lighting presentation. The emotive light processing unit 386 may receive the message from another wagering game machine in the bank, from the master wagering game machine in the bank, or from other components in the wagering game system 300 (e.g., the wagering game server 350). In one example, the wagering game machine 360 may be the wagering game machine 160A in the bank of wagering game machines 160A-160D shown in FIG. 1. As described above with reference to FIG. 1, the received message may also include information associated with the lighting presentation, e.g., a lighting presentation ID number identifying the specific lighting presentation. The received message may further include information used to implement the position-based lighting coordination process; e.g., the message may include an indication of the reference wagering game machine and the base time delay associated with the lighting presentation. After block 402, the flow continues at block 404.

At block 404, the emotive light controller 365 of the wagering game machine 360 determines a position offset based on the position of the wagering game machine within the bank relative to the reference wagering game machine. In one embodiment, the delay determination unit 385 of the emotive light controller 365 determines the position offset based on a position number associated with the wagering game machine 360 and a position number associated with the reference wagering game machine. As described above, in one example, the delay determination unit 385 can determine the position offset by subtracting the position number associated with the reference wagering game machine from the position number associated with the wagering game machine 360 (or vice versa). For light effects from leftmost node to rightmost node (or from rightmost node to leftmost node) in a bank of wagering game machines, the position number can be the position number programmed by the wagering game machine operator when the bank is configured. For light effects that radiate outward (or inward) in a bank of wagering game machines, the position number for the trigger wagering game machine (which will also be the reference wagering game machine) can be a radiating position number of "1". Both the wagering game machine immediately to the right and the wagering game machine immediately to the left of the trigger wagering game machine can be assigned a radiating position number of "2", and so on. The wagering game machine may determine the type of light effect that will be presented across the bank based on information included in the message associated with the lighting presentation. In some embodiments, for light effects that radiate both outward and inward and/or wrap around in a bank of wagering game machines, two different position numbers can be assigned to the same wagering game machine 360, as will be further described below with reference to FIG. 5. After block 404, the flow continues at block 406.

At block 406, the emotive light controller 365 of the wagering game machine 360 determines a position-based time delay for initiating the lighting presentation based, at least in part, on the position offset. In one embodiment, the delay determination unit 385 of the emotive light controller 365 determines the position-based time delay for initiating the lighting presentation based on the position offset associated with the wagering game machine 360 and the base time delay associated with the lighting presentation. As described above, the position-based time delay associated with a wagering game machine is the amount of time the wagering game machine 360 will wait to initiate the lighting presentation. In one example, the delay determination unit 385 can determine the position-based time delay by multiplying the position offset with the base time delay. As described above, in some embodiments, the position-based time delay and the base time delay can be in terms of a synchronization or "heartbeat" signal that is provided to the bank of wagering game machines to help with synchronization of lighting presentations. After block 406, the flow continues at block 408.

At block 408, the emotive light controller 365 of the wagering game machine 360 initiates the lighting presentation after waiting the position-based time delay. After block 408, the flow ends.

Figure 5:
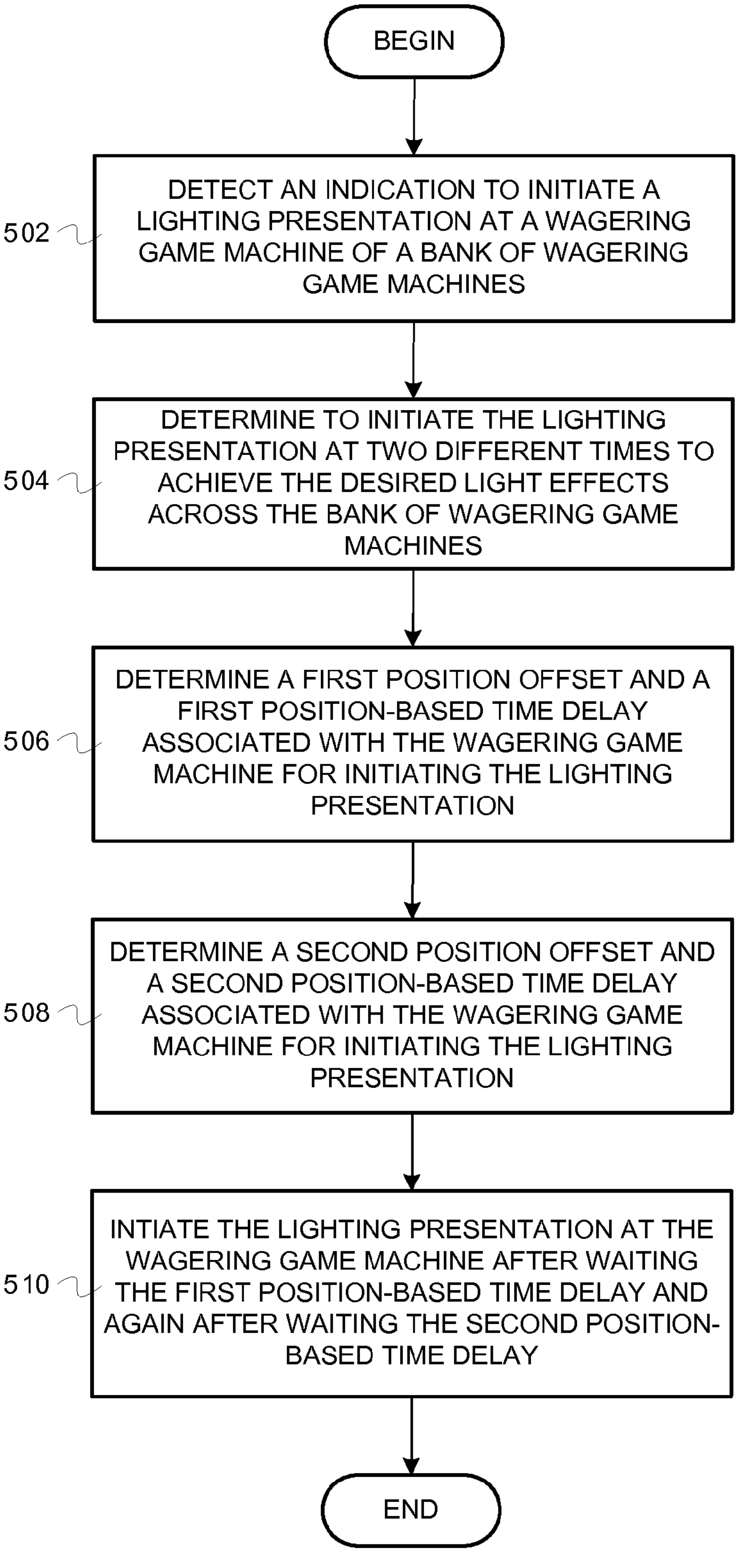
FIG. 5 is a flow diagram illustrating additional operations for implementing a position-based lighting coordination process in a bank of wagering game machines, according to some embodiments.

FIG. 5 is a flow diagram ("flow") 500 illustrating additional operations for implementing a position-based lighting coordination process in a bank of wagering game machines, according to some embodiments. The flow of 500 will be described with reference to the example system architecture of FIG. 3. Although the functionality of one of the wagering game machine is highlighted in this example, it is noted that each of the wagering game machines in the bank can implement similar functionality as described herein. The flow diagram begins at block 502.

At block 502, an emotive light controller 365 of a wagering game machine 360 in a bank of wagering game machines detects an indication to initiate a lighting presentation at the wagering game machine 360. As described above, in one embodiment, the emotive light processing unit 386 of the emotive light controller 365 receives a message including an indication to initiate the lighting presentation. The message may also include information associated with the lighting presentation; e.g., the message may include a lighting presentation ID number identifying the specific lighting presentation, and information about the light effects that will be presented across the bank of wagering game machines. The message may further include information used to implement the position-based lighting coordination process; e.g., the message may include an indication of the reference wagering game machine and the base time delay associated with the lighting presentation. In one example, the wagering game machine 360 may be the wagering game machine 160A in the bank of wagering game machines 160A-160D shown in FIG. 1. In one example, the wagering game machine 360 may be the wagering game machine 160C in the bank of wagering game machines 160A-160F shown in FIG. 2. After block 502, the flow continues at block 504.

At block 504, an emotive light controller 365 of a wagering game machine 360 in a bank of wagering game machines determines to initiate the light presentation at two different times to achieve the desired light effects across the bank of wagering game machines. In one embodiment, the emotive light processing unit 386 of the emotive light controller 365 determines that the lighting presentation will need to be initiated at two different times to achieve the desired light effects across the bank based on the information associated with the lighting presentation received in the message. In one example, the message may indicate that the light effects across the bank of wagering game machines will be radiating outward and inward light effects from a trigger wagering game machine. In another example, the message may indicate that the light effects across the bank of wagering game machines will be from the leftmost wagering game machine to the rightmost wagering game machine, and then "bounce back" or wrap around from the rightmost wagering game machine back to the leftmost wagering game machine. It is noted, however, that various other examples of light effects can be implemented across the bank of wagering game machines that necessitate the wagering game machine to initiate lighting presentation at two or more different times. After block 504, the flow continues at block 506.

At block 506, the emotive light controller 365 of the wagering game machine 360 determines a first position offset and a first position-based time delay associated with the wagering game machine 360 for initiating the lighting presentation. In one embodiment, the delay determination unit 385 of the emotive light controller 365 determines the first position offset based on the position of the wagering game machine within the bank relative to the reference wagering game machine. As described above, in one example, the delay determination unit 385 can determine the first position offset by subtracting the position number associated with the reference wagering game machine from the position number associated with the wagering game machine 360 (or vice versa). The delay determination unit 385 determines the first position-based time delay for initiating the lighting presentation based on the first position offset associated with the wagering game machine 360 and the base time delay associated with the lighting presentation. In one example, the delay determination unit 385 can determine the first position-based time delay by multiplying the first position offset with the base time delay. After block 506, the flow continues at block 508.

At block 508, the emotive light controller 365 of the wagering game machine 360 determines a second position offset and a second position-based time delay associated with the wagering game machine 360 for initiating the lighting presentation. In one embodiment, the delay determination unit 385 of the emotive light controller 365 determines the second position offset based on the position of the wagering game machine within the bank relative to the reference wagering game machine in conjunction with the desired light effect across the bank of wagering game machines. For example, with reference to FIG. 1, the light effects across the bank of wagering game machines may be from the leftmost wagering game machine 160A to the rightmost wagering game machine 160D, and then "bounce back" or wrap around from the rightmost wagering game machine 160D back to the leftmost wagering game machine 160A. In this example, since the reference wagering game machine is the leftmost wagering game machine 160A, the first position offset for the wagering game machine 160B is 1 when the light effects move from left to right. The second position offset for the wagering game machine 160B is 6 when the light effects move from right to left. In this same example, the first position offset for the wagering game machine 160D is 3 when the light effects move from left to right, and the second position offset for the wagering game machine 160D is 4 when the light effects move from right to left (because the rightmost wagering game machine 160D will be initiated twice in a row when the light effects bounce back or wrap around). In another example, with reference to FIG. 2, the light effects across the bank of wagering game machines may radiate outward and then inward from a trigger wagering game machine (e.g., the wagering game machine 160C). In this example, since the reference wagering game machine is the trigger wagering game machine 160C, the first position offset for the wagering game machine 160E is 2 when the light effects radiate outward from the trigger wagering game machine 160C. The second position offset for the wagering game machine 160E is 4 when the light effects radiate inward.

The delay determination unit 385 determines the second position-based time delay for initiating the lighting presentation based on the second position offset associated with the wagering game machine 360 and the base time delay associated with the lighting presentation. In one example, the delay determination unit 385 can determine the second position-based time delay by multiplying the second position offset with the base time delay. After block 508, the flow continues at block 510.

At block 510, the emotive light controller 365 of the wagering game machine 360 initiates the lighting presentation a first time after waiting the first position-based time delay, and initiates the lighting presentation a second time after waiting the second position-based time delay. In these examples, if each wagering game machine in the bank coordinates the initiation of the lighting presentation at two different times utilizing the position-based lighting coordination process, the desired light affects across the bank of wagering game machines can be achieved. After block 510, the flow ends.

In some embodiments, some nodes in a bank of wagering game machines may be configured as a non-participatory node. For example, an overhead sign or LCD screen or spotlight can be a non-participatory node. In some examples, a wagering game machine can be a non-participatory node to vary the light effects across the bank. In one embodiment, a non-participatory node, such as an overhead sign, can include different software and hardware that inherently results in the node not participating in the lighting presentations. In another embodiment, if a node does have the same software and hardware and therefore the capability to participate in the lighting presentations, in some instances the node may be assigned a position number of "0" to configure the node as a non-participatory node. In this example, the node will be a non-participatory node in the sense that the node will not participate in the position-based lighting coordination process.

It is noted that, although the examples described above implement the position-based lighting coordination process across a bank of wagering game machines, in some embodiments the position-based lighting coordination process can be further implemented across two or more banks of wagering game machines.

Additional Example Operating Environments

This section describes example operating environments, systems and networks, and presents structural aspects of some embodiments.

Wagering Game Machine Architecture

Figure 6:
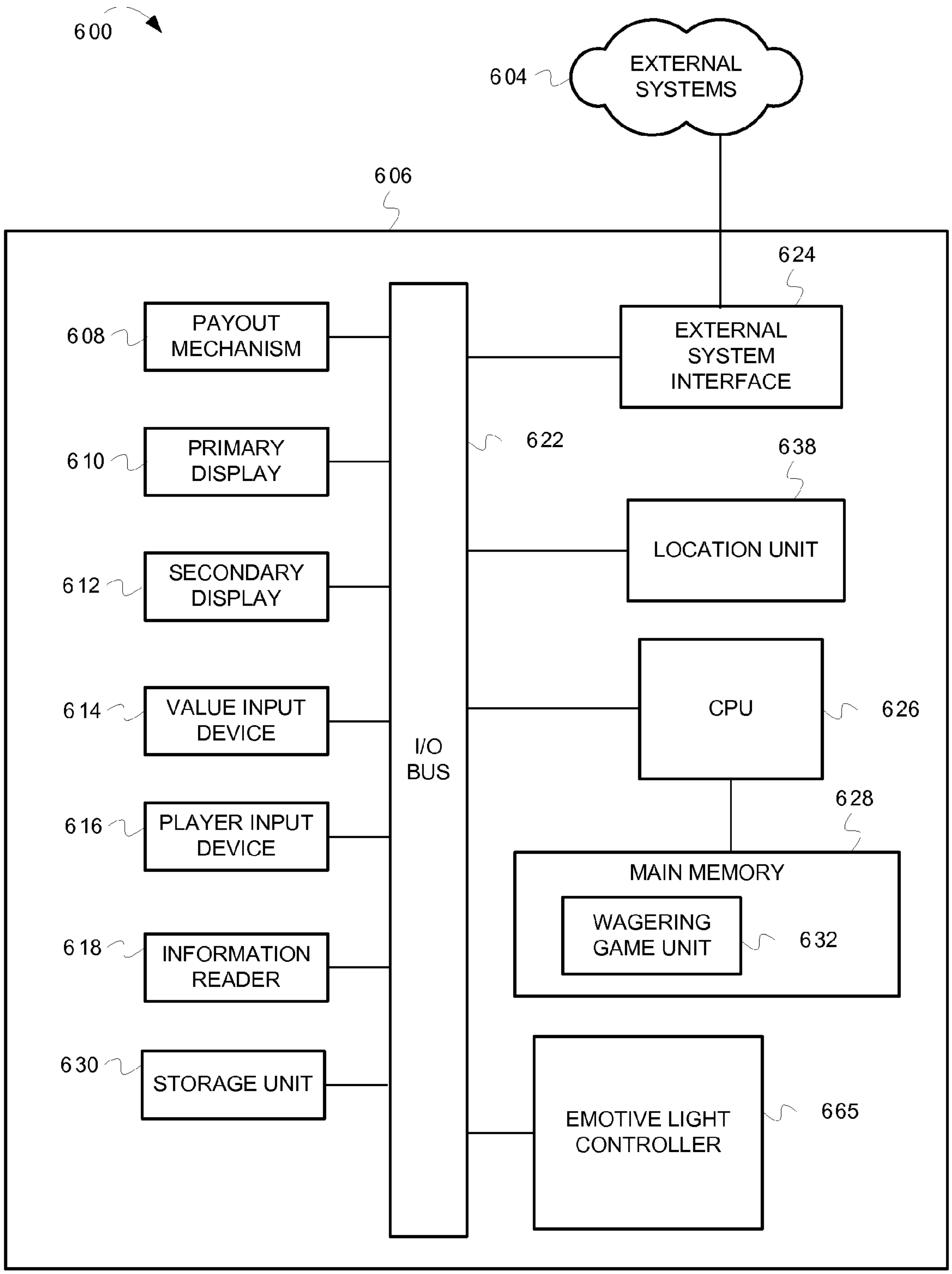
FIG. 6 is a conceptual diagram that illustrates an example of a wagering game machine architecture, according to some embodiments.

FIG. 6 is a conceptual diagram that illustrates an example of a wagering game machine architecture 600, according to some embodiments. In FIG. 6, the wagering game machine architecture 600 includes a wagering game machine 606, which includes a central processing unit (CPU) 626 connected to main memory 628. The CPU 626 can include any suitable processor, such as an Intel® Pentium processor, Intel® Core 2 Duo processor, AMD Opteron™ processor, or UltraSPARC processor. The main memory 628 includes a wagering game unit 632. In some embodiments, the wagering game unit 632 can present wagering games, such as video poker, video black jack, video slots, video lottery, reel slots, etc., in whole or part.

The CPU 626 is also connected to an input/output ("I/O") bus 622, which can include any suitable bus technologies, such as an AGTL+ frontside bus and a PCI backside bus. The I/O bus 622 is connected to a payout mechanism 608, primary display 610, secondary display 612, value input device 614, player input device 616, information reader 618, and storage unit 630. The player input device 616 can include the value input device 614 to the extent the player input device 616 is used to place wagers. The I/O bus 622 is also connected to an external system interface 624, which is connected to external systems 604 (e.g., wagering game networks). The external system interface 624 can include logic for exchanging information over wired and wireless networks (e.g., 802.11g transceiver, Bluetooth transceiver, Ethernet transceiver, etc.)

The I/O bus 622 is also connected to a location unit 638. The location unit 638 can create player information that indicates the wagering game machine's location/movements in a casino. In some embodiments, the location unit 638 includes a global positioning system (GPS) receiver that can determine the wagering game machine's location using GPS satellites. In other embodiments, the location unit 638 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 6, in some embodiments, the location unit 638 is not connected to the I/O bus 622.

In some embodiments, the wagering game machine 606 can include additional peripheral devices and/or more than one of each component shown in FIG. 6. For example, in some embodiments, the wagering game machine 606 can include multiple external system interfaces 624 and/or multiple CPUs 626. In some embodiments, any of the components can be integrated or subdivided.

In some embodiments, the wagering game machine 606 includes an emotive light controller 665 configured to perform the operations described above with reference to FIGS. 1-5.

Furthermore, any component of the wagering game machine 606 can include hardware, firmware, and/or machine-readable storage media including instructions for performing the operations described herein.

Example Wagering Game Machines

Figure 7:
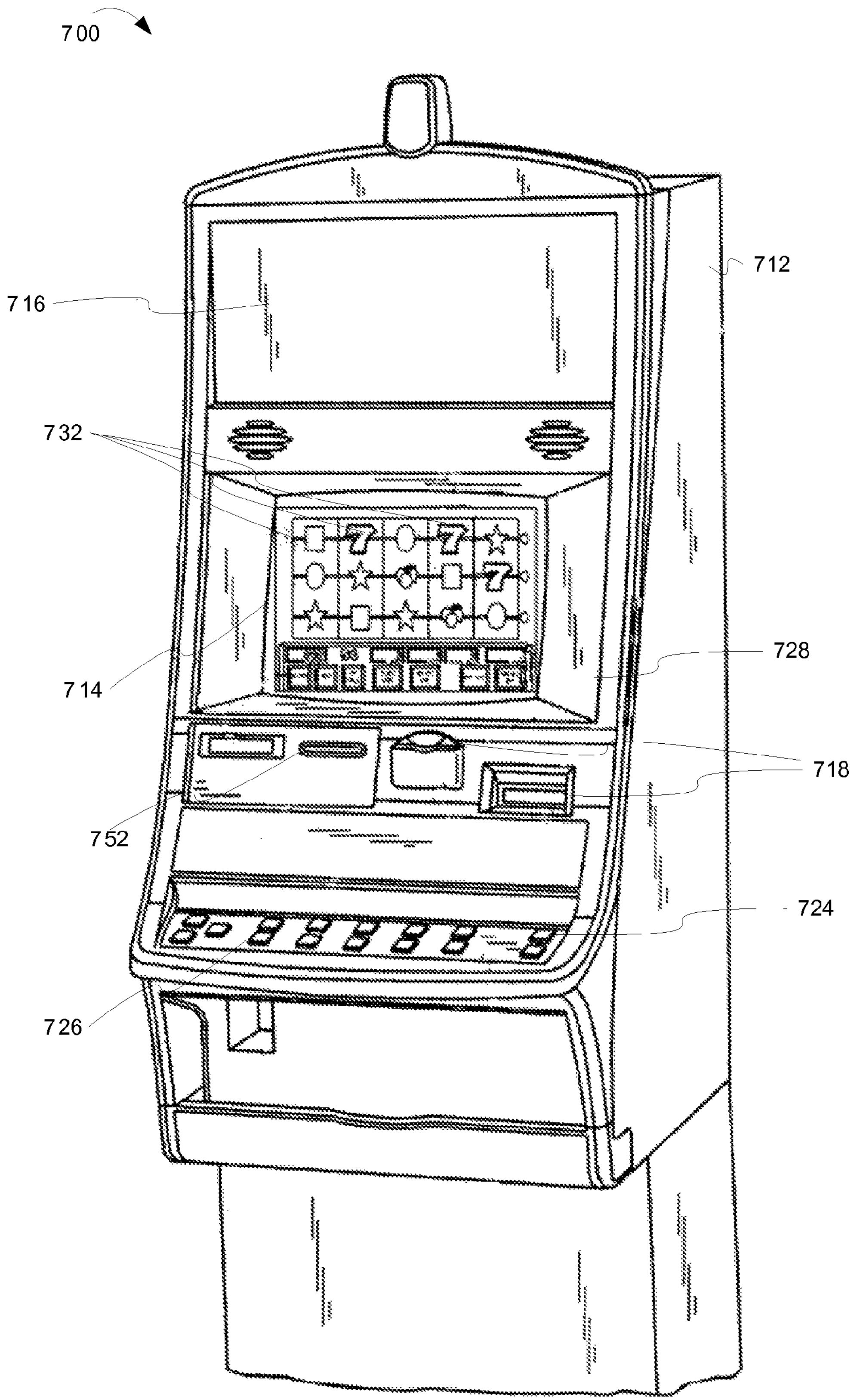
FIG. 7 is a perspective view of a wagering game machine, according to example embodiments.

FIG. 7 is a perspective view of a wagering game machine, according to example embodiments. Referring to FIG. 7, a wagering game machine 700 is used in gaming establishments, such as casinos. In some embodiments, the wagering game machine 700 can incorporate the functionality described above in FIGS. 1-6 for implementing a position-based lighting coordination process.

According to embodiments, the wagering game machine 700 can be any type of wagering game machine and can have varying structures and methods of operation. For example, the wagering game machine 700 can be an electromechanical wagering game machine configured to play mechanical slots, or it can be an electronic wagering game machine configured to play video casino games, such as blackjack, slots, keno, poker, blackjack, roulette, etc.

The wagering game machine 700 comprises a housing 712 and includes input devices, including value input devices 718 and a player input device 724. For output, the wagering game machine 700 includes a primary display 714 for displaying information about a basic wagering game. In some implementations, the primary display 714 can also display information about a bonus wagering game and a progressive wagering game. The wagering game machine 700 also includes a secondary display 716 for displaying bonus wagering games, wagering game events, wagering game outcomes, and/or signage information. While some components of the wagering game machine 700 are described herein, numerous other elements can exist and can be used in any number or combination to create varying forms of the wagering game machine 700.

The value input devices 718 can take any suitable form and can be located on the front of the housing 712. The value input devices 718 can receive currency and/or credits inserted by a player. The value input devices 718 can include coin acceptors for receiving coin currency and bill acceptors for receiving paper currency. Furthermore, the value input devices 718 can include ticket readers or barcode scanners for reading information stored on vouchers, cards, or other tangible portable storage devices. The vouchers or cards can authorize access to central accounts, which can transfer money to the wagering game machine 700.

The player input device 724 comprises a plurality of push buttons on a button panel 726 for operating the wagering game machine 700. In addition, or alternatively, the player input device 724 can comprise a touch screen 728 mounted over the primary display 714 and/or secondary display 716.

The various components of the wagering game machine 700 can be connected directly to, or contained within, the housing 712. Alternatively, some of the wagering game machine's components can be located outside of the housing 712, while being communicatively coupled with the wagering game machine 700 using any suitable wired or wireless communication technology.

The operation of the basic wagering game can be displayed to the player on the primary display 714. The primary display 714 can also display a bonus game associated with the basic wagering game. The primary display 714 can include a cathode ray tube (CRT), a high resolution liquid crystal display (LCD), a plasma display, light emitting diodes (LEDs), or any other type of display suitable for use in the wagering game machine 700. Alternatively, the primary display 714 can include a number of mechanical reels to display the outcome. In FIG. 7, the wagering game machine 700 is an "upright" version in which the primary display 714 is oriented vertically relative to the player. Alternatively, the wagering game machine can be a "slant-top" version in which the primary display 714 is slanted at about a thirty-degree angle toward the player of the wagering game machine 700. In yet another embodiment, the wagering game machine 700 can exhibit any suitable form factor, such as a free standing model, bartop model, mobile handheld model, or workstation console model.

A player begins playing a basic wagering game by making a wager via the value input device 718. The player can initiate play by using the player input device's buttons or touch screen 728. The basic game can include arranging a plurality of symbols along a payline 732, which indicates one or more outcomes of the basic game. Such outcomes can be randomly selected in response to player input. At least one of the outcomes, which can include any variation or combination of symbols, can trigger a bonus game.

In some embodiments, the wagering game machine 700 can also include an information reader 752, which can include a card reader, ticket reader, bar code scanner, RFID transceiver, or computer readable storage medium interface. In some embodiments, the information reader 752 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computer-implemented method comprising:

detecting, at a wagering game machine of a bank of wagering game machines, an indication to initiate a lighting presentation on the wagering game machine of the bank of wagering game machines;

determining, at the wagering game machine, a position offset associated with the wagering game machine based, at least in part, on a position of the wagering game machine within the bank of wagering game machines relative to a reference wagering game machine of the bank of wagering game machines;

determining, at the wagering game machine, a position-based time delay for initiating the lighting presentation on the wagering game machine based, at least in part, on the position offset associated with the wagering game machine; and initiating the lighting presentation on the wagering game machine after the position-based time delay associated with the wagering game machine.

2. The computer-implemented method of claim 1, wherein said detecting an indication to initiate the lighting presentation comprises receiving a message comprising an indication to initiate the lighting presentation and information associated with the lighting presentation, wherein said information associated with the lighting presentation comprises one or more of a lighting presentation identification number, an indication of the reference wagering game machine, and a base time delay associated with the lighting presentation.

3. The computer-implemented method of claim 2, wherein said initiating the lighting presentation on the wagering game machine after the position-based time delay associated with the wagering game machine comprises initiating the lighting presentation on the wagering game machine after waiting the position-based time delay from a point in time specified by the message associated with the lighting presentation.

4. The computer-implemented method of claim 2, wherein said message is received from one or more of a wagering game server of a wagering game system, another wagering game machine in the bank, and a master wagering game machine in the bank.

5. The computer-implemented method of claim 1, wherein said determining the position offset associated with the wagering game machine comprises:

determining a position number associated with the wagering game machine relative to a position number associated with the reference wagering game machine; and determining the position offset based on a difference between the position number associated with the wagering game machine and the position number associated with the reference wagering game machine.

6. The computer-implemented method of claim 1, wherein said determining the position-based time delay for initiating the lighting presentation comprises:

determining a base time delay associated with the lighting presentation; and determining the position-based time delay for initiating the lighting presentation on the wagering game machine based on the position offset and the base time delay.

7. The computer-implemented method of claim 6, wherein said determining the position-based time delay for initiating the lighting presentation on the wagering game machine based on the position offset and the base time delay comprises calculating the position-based time delay by multiplying the position offset by the base time delay.

8. The computer-implemented method of claim 4, further comprising receiving a synchronization signal from a master wagering game machine of the bank of wagering game machines, wherein the synchronization signal comprises a signal that is pulsed at a periodic interval of time, wherein the position-based time delay for initiating the lighting presentation comprises a period of time equal to one or more cycles of the synchronization signal.

9. The computer-implemented method of claim 8, wherein said initiating the lighting presentation on the wagering game machine after the position-based time delay associated with the wagering game machine comprises initiating the lighting presentation on the wagering game machine after waiting the position-based time delay from a next cycle associated with the synchronization signal.

10. The computer-implemented method of claim 1, further comprising:

- determining a second position offset associated with the wagering game machine based, at least in part, on the position of the wagering game machine within the bank of wagering game machines relative to the reference wagering game machine; and
- determining a second position-based time delay for initiating the lighting presentation at the wagering game machine based on the second position offset and the base time delay.

11. An emotive light controller configured to control lighting presentations on a wagering game machine of a bank of wagering game machines, the emotive light controller comprising:

- an emotive light processing unit configured to detect an indication to initiate a lighting presentation on the wagering game machine; and
- a delay determination unit configured to determine a position offset associated with the wagering game machine based, at least in part, on a position of the wagering game machine within the bank of wagering game machines relative to a reference wagering game machine of the bank of wagering game machines, and configured to:
  - determine a position-based time delay for initiating the lighting presentation on the wagering game machine based, at least in part, on the position offset associated with the wagering game machine; and
- the emotive light processing unit further configured to:
  - initiate the lighting presentation on the wagering game machine after the position-based time delay associated with the wagering game machine.

12. The emotive light controller of claim 11, wherein the delay determination unit configured to determine the position offset associated with the wagering game machine comprises the delay determination unit configured to:

- determine a position number associated with the wagering game machine relative to a position number associated with the reference wagering game machine; and
- determine the position offset based on a difference between the position number associated with the wagering game machine and the position number associated with the reference wagering game machine.

13. The emotive light controller of claim 11, wherein the delay determination unit configured to determine the position-based time delay for initiating the lighting presentation comprises the delay determination unit configured to:

- determine a base time delay associated with the lighting presentation; and
- determine the position-based time delay for initiating the lighting presentation on the wagering game machine based on the position offset and the base time delay.

14. The emotive light controller of claim 13, wherein the delay determination unit configured to determine the position-based time delay for initiating the lighting presentation at the wagering game machine based on the position offset and the base time delay comprises the delay determination unit configured to calculate the position-based time delay by multiplying the position offset by the base time delay.

15. A computer-implemented method comprising:

- detecting, at a wagering game machine of a bank of wagering game machines, a message comprising an indication to initiate a lighting presentation on the wagering game machine of the bank of wagering game machines;
- determining, at the wagering game machine, a reference wagering game machine of the bank of wagering game machines;
- determining, at the wagering game machine, a first position offset and a second position offset associated with the wagering game machine based, at least in part, on a position of the wagering game machine within the bank of wagering game machines relative to a position of the reference wagering game machine of the bank of wagering game machines;
- determining, at the wagering game machine, a first position-based time delay for initiating the lighting presentation on the wagering game machine based, at least in part, on the first position offset associated with the wagering game machine;
- determining, at the wagering game machine, a second position-based time delay for initiating the lighting presentation on the wagering game machine based, at least in part, on the second position offset associated with the wagering game machine; and
- initiating the lighting presentation on the wagering game machine a first time after the first position-based time delay and initiating the lighting presentation on the wagering game machine a second time after the second position-based time delay.

16. The computer-implemented method of claim 15, wherein said determining the first position offset and the second position offset associated with the wagering game machine comprises:

- determining a position number associated with the wagering game machine relative to a position number associated with the reference wagering game machine; and
- determining the first position offset and the second position offset based on the position number associated with the wagering game machine and the position number associated with the reference wagering game machine.

17. The computer-implemented method of claim 15, wherein:

- said determining the first position-based time delay for initiating the lighting presentation comprises:
  - determining a base time delay associated with the lighting presentation; and
  - determining the first position-based time delay for initiating the lighting presentation the first time on the wagering game machine based on the first position offset and the base time delay; and
- said determining the second position-based time delay for initiating the lighting presentation comprises:

determining the base time delay associated with the lighting presentation; and determining the second position-based time delay for initiating the lighting presentation the second time on the wagering game machine based on the second position offset and the base time delay.

18. An emotive light controller configured to control lighting presentations on a wagering game machine of a bank of wagering game machines, the emotive light controller comprising:

means for detecting a message comprising an indication to initiate a lighting presentation on the wagering game machine;

means for determining a position offset associated with the wagering game machine based, at least in part, on a position of the wagering game machine within the bank of wagering game machines relative to a reference wagering game machine of the bank of wagering game machines;

means for determining a position-based time delay for initiating the lighting presentation on the wagering game machine based, at least in part, on the position offset associated with the wagering game machine; and means for initiating the lighting presentation on the wagering game machine after the position-based time delay associated with the wagering game machine.

19. The emotive light controller of claim 18, wherein said means for determining the position offset associated with the wagering game machine comprises:

means for determining a position number associated with the wagering game machine relative to a position number associated with the reference wagering game machine; and means for determining the position offset based on a difference between the position number associated with the wagering game machine and the position number associated with the reference wagering game machine.

20. The emotive light controller of claim 18, wherein said means for determining the position-based time delay for initiating the lighting presentation comprises:

means for determining a base time delay associated with the lighting presentation; and means for determining the position-based time delay for initiating the lighting presentation on the wagering game machine based on the position offset and the base time delay.

21. The emotive light controller of claim 20, wherein said means for determining the position-based time delay for initiating the lighting presentation on the wagering game machine based on the position offset and the base time delay comprises means for calculating the position-based time delay by multiplying the position offset by the base time delay.

22. One or more non-transitory machine-readable storage media, having instructions stored therein, which, when executed by one or more processors causes the one or more processors to perform operations that comprise:

detecting an indication to initiate a lighting presentation on a wagering game machine of a bank of wagering game machines;

determining a position offset associated with the wagering game machine based, at least in part, on a position of the wagering game machine within the bank of wagering game machines relative to a reference wagering game machine of the bank of wagering game machines;

determining a position-based time delay for initiating the lighting presentation on the wagering game machine based, at least in part, on the position offset associated with the wagering game machine; and initiating the lighting presentation on the wagering game machine after the position-based time delay associated with the wagering game machine.

23. The non-transitory machine-readable storage media of claim 22, wherein said operation of determining the position offset associated with the wagering game machine comprises:

determining a position number associated with the wagering game machine relative to a position number associated with the reference wagering game machine; and determining the position offset based on a difference between the position number associated with the wagering game machine and the position number associated with the reference wagering game machine.

24. The non-transitory machine-readable storage media of claim 22, wherein said operation of determining the position-based time delay for initiating the lighting presentation comprises:

determining a base time delay associated with the lighting presentation; and determining the position-based time delay for initiating the lighting presentation on the wagering game machine based on the position offset and the base time delay.

25. The non-transitory machine-readable storage media of claim 24, wherein said operation of determining the position-based time delay for initiating the lighting presentation on the wagering game machine based on the position offset and the base time delay comprises calculating the position-based time delay by multiplying the position offset by the base time delay.

* * * * *